United States Patent

Naito et al.

[11] Patent Number: 6,050,655
[45] Date of Patent: Apr. 18, 2000

[54] ANTISKID BRAKE CONTROLLER

[75] Inventors: Yasuo Naito; Chiaki Fujimoto, both of Tokyo, Japan

[73] Assignee: Mitsubishi Denki Kabushiki Kaisha, Tokyo, Japan

[21] Appl. No.: 08/969,547

[22] Filed: Nov. 13, 1997

[30] Foreign Application Priority Data

Jun. 2, 1997 [JP] Japan .................................. 9-144189

[51] Int. Cl.$^7$ ...................................................... B60T 8/70
[52] U.S. Cl. ........................... 303/173; 303/189; 303/167
[58] Field of Search .................... 303/165, 164, 303/163, 154, 189

[56] References Cited

U.S. PATENT DOCUMENTS

| | | | |
|---|---|---|---|
| 4,805,104 | 2/1989 | Kishimoto et al. | 701/70 |
| 5,242,216 | 9/1993 | Miyawaki et al. | 303/167 |
| 5,259,667 | 11/1993 | Okazaki et al. | 303/173 |
| 5,265,946 | 11/1993 | Bader | 303/189 |
| 5,433,513 | 7/1995 | Takayama | 303/167 |
| 5,492,394 | 2/1996 | Kusano et al. | 303/189 |
| 5,620,238 | 4/1997 | Takeuchi | 303/189 |

FOREIGN PATENT DOCUMENTS

| | | |
|---|---|---|
| 3637722 | 5/1987 | Germany . |
| 3733661 | 4/1988 | Germany . |
| 19722054 | 3/1998 | Germany . |
| 7-205790 | 7/1995 | Japan . |

*Primary Examiner*—Christopher P. Schwartz
*Assistant Examiner*—Mariano Sy
*Attorney, Agent, or Firm*—Sughrue, Mion, Zinn, Macpeak & Seas, PLLC

[57] ABSTRACT

An antiskid brake controller, which can secure safety by avoiding a cascade caused when a braking pressure is reduced in a four-wheel-drive vehicle, includes wheel speed sensors braking force adjuster for adjusting a braking pressure and an ECU for calculating the control amount of a breaking force adjuster so as to prevent the locking tendency of each of the wheels based on a wheel speed Vw. The ECU includes means for the wheel deceleration calculator Gw corresponding to the locking tendency of each of the wheels, a basic vehicle calculator speed, a slip amount calculator SL based on the wheel speed Vw and the basic vehicle speed, cascade determination device for determining the occurrence of the cascade state when an unstable state occurs such that the slip amounts of three wheels are larger than a predetermined value and control amount corrector for changing the control amount of the braking pressure in an increasing pressure reduction amount when the occurrence of the cascade is determined.

9 Claims, 12 Drawing Sheets

ANTISKID BRAKE CONTROLLER

BACKGROUND OF THE INVENTION

1. Field of the Invention

The present invention relates to an antiskid brake controller for preventing wheels from tending to be locked when a brake is applied, on a road surface on which a four-wheel-drive vehicle travels, and more specifically, to an antiskid brake controller capable of preventing a cascade (an unstable state) when a braking pressure is reduced while all the wheels are continuously driven.

2. Description of the Related Art

Conventionally, there have been well known antiskid brake controllers called ABS which avoid a locked state by reducing a braking pressure when the locking tendencies of wheels are detected, based on wheel speeds detected by wheel speed sensors when a brake is applied, slip amounts presumingly calculated from the wheel speeds or the like.

However, in four-wheel-drive vehicles, when a braking pressure is imposed on respective wheels to which engine torque is transmitted under respective conditions, a locking tendency or a slip is liable to be caused by an effect of the wheels different from a normal wheel lock, from which an unstable state called a cascade results.

To prevent the above problem, there has been proposed an antiskid brake controller which can switch a driving state from a four-wheel-drive-state to a two-wheel drive-state when ABS control is executed as shown in, for example, Japanese Unexamined Patent Publication No. 7-205790.

In this case, the reduction of the braking pressure applied to a wheel whose wheel speed is reduced by the occurrence of a slip is increased to thereby eliminate the locking tendency of the wheel.

FIG. 10 is a block diagram showing the schematic arrangement of an ordinary antiskid brake controller, FIG. 11 is a view specifically showing the arrangement of a hydraulic passage in the vicinity of actuators in FIG. 10 and FIG. 12 is a view showing the arrangement of the actuators in FIG. 11 in more detail paying attention to a wheel.

In the respective drawings, all the four wheels 1a–1d, that is, all of the front wheels 1a, 1b and the rear wheels 1c, 1d of a four-wheel-drive vehicle act as driving wheels coupled with an engine (not shown).

Wheel speed sensors (wheel speed sensing means) 2a–2d, of an electromagnetic pickup system or the like, individually detect the rotational speeds of the respective wheels 1a–1d as wheel speed signals Va–Vd.

Braking units 7a–7d each composed of a wheel cylinder are individually disposed to the respective wheels 1a–1d and pressed thereagainst in accordance with braking pressures Pa–Pd supplied from the actuators 10a–10d.

A master cylinder 9 coupled with a brake pedal 8 creates a braking pressure (hydraulic pressures) in response to an amount of depression of the brake pedal 8 and supplies it to the actuators 10a–10d including electromagnetic solenoids through a hydraulic pipe.

The actuators 10a–10d adjust the braking pressure supplied from the master cylinder 9 in accordance with control signals Ca–Cd and CM (to be described later) and individually supply the thus adjusted braking pressures to brake units 7a–7d.

With this operation, the brake units 7a–7d generate braking forces to the respective wheels 1a–1d in response to the amount of depression of the brake pedal 8 as well as in accordance with the control signals Ca–Cd and CM.

In FIG. 10, an ECU (electronic control unit) 11 provided with the vehicle constitutes the main body of the antiskid brake controller and includes waveform shaping/amplifying circuits 20a–20d, a power supply circuit 22, a microcomputer 23, actuator driving circuits 24a–24d and a motor relay driving circuit 25.

The power supply circuit 22 supplies a constant voltage to the microcomputer 23 when an ignition switch 27 is turned ON.

The microcomputer 23 includes a CPU 23a, a RAM 23b and a ROM 23c.

The ECU 11 calculates wheel speeds Vwa–Vwd from the respective wheel speed signals Va–Vd as well as individually calculates wheel decelerations corresponding to the locking tendencies of the respective wheels 1a–1d based on the differential waveforms of the wheel speeds Vwa–Vwd.

Further, the ECU 11 calculates control amounts sent to the braking force adjustment means composed of the respective actuators 10a–10d and a motor 15 (motor relay 16), creates the control signals Ca–Cd and CM for preventing the locking tendencies and adjusts the braking pressures Pa–Pd to the respective wheels 1a–1d.

The respective actuator driving circuits 24a–24d individually output the control signals Ca–Cd to the electromagnetic solenoids of the respective actuators 10a–10d in response to a control command from the microcomputer 23.

The motor relay driving circuit 25 outputs the control signal CM to the motor relay 16 when the braking pressure is to be adjusted and turns ON the normally open contact of the motor relay 16 by energizing the coil 16b of the motor relay 16 to thereby drive the motor 15.

With this operation, the motor 15 which constitutes a braking pressure adjustment pump adjusts the braking pressure Pa–Pd in cooperation with the actuators 10a–10d.

In FIG. 11, a reservoir tank 14, which communicates with the motor 15, supplies and collects a hydraulic pressure to and from the respective actuators 10a–10d through a hydraulic passage communicating with the respective actuators 10a–10d.

FIG. 12 shows only one of the actuators (for example, the actuator 10a) in FIG. 11, the actuator 10a including a braking pressure maintaining solenoid valve 12 and a braking pressure reducing solenoid valve 13. The other not shown actuators 10b–10d also have the same arrangement.

The pressure maintaining solenoid valve 12 is in the inlet hydraulic passage from the master cylinder 9 to the brake unit 7a and the pressure reducing solenoid valve 13 is connected to the outlet hydraulic passage from the brake unit 7a to the reservoir tank 14.

That is, the pressure reducing solenoid valve 13 is connected to the liquid pressure collecting passage from the reservoir tank 14 to the master cylinder 9, the passage going through the motor 15, for supplying and collecting the liquid pressure.

With this arrangement, the respective solenoid valves 12, 13 are energized or deenergized in response to the control signal Ca from the ECU 11 to thereby execute switching in order to maintain, increase, or reduce the braking pressure.

Ordinarily, the pressure maintaining solenoid valve 12 is opened and the pressure reducing solenoid valve 13 is closed when the antiskid brake controller is not in operation.

Next, ordinary ABS control operation will be described.

In FIG. 12, when the driver depresses the brake pedal 8, a pressure is supplied to the master cylinder 9 and a braking fluid fed from the master cylinder 9 flows into the brake unit 7a through the pressure maintaining solenoid valve 12 in the actuator 10a to thereby increase the braking pressure Pa.

When a wheel deceleration corresponding to a locked state is detected and the control signal Ca indicating pressure reduction is created by the ECU 11, the electromagnetic solenoids of the pressure maintaining solenoid valve 12 and the pressure reducing solenoid valve 13 are driven by being energized.

With this operation, the pressure holding solenoid valve 12 is closed to thereby shut off the hydraulic passage from the master cylinder 9 to the brake unit 7a and the pressure reducing solenoid valve 13 is opened to thereby connect the hydraulic passage from the brake unit 7a to the reservoir tank 14.

Therefore, the braking pressure Pa in the brake unit 7a flows into the reservoir tank 14 and is reduced.

At the same time, since the ECU 11 creates the control signal CM for operating the motor 15, the pressure of the braking fluid having flowed into the reservoir tank 14 is increased and the braking fluid having the increased pressure is returned to the main passage on the master cylinder 9 side to be used in the next brake control.

Thereafter, when the ECU 11 creates the control signal Ca for maintaining pressure and only the pressure maintaining solenoid valve 12 is energized (the passage is closed), since the other valves are deenergized, all the hydraulic passages are shut off and the braking pressure Pa to the wheel 1a is maintained.

When the ECU 11 creates the control signal Ca for increasing pressure and the pressure maintaining solenoid valve 12 and the pressure reducing solenoid valve 13 are deenergized, the hydraulic passage between the master cylinder 9 and the brake unit 7a is connected again.

With this operation, since the high pressure braking fluid having been returned to the main passage on the master cylinder 9 side flows into the brake unit 7a again together with the braking fluid discharged from the motor 15, the braking pressure Pa to the wheel 1a is increased.

As described above, although the braking pressures are conventionally controlled while avoiding the locking tendencies, since traveling conditions and road surface conditions are different in respective wheels, it is difficult to properly avoid the locking tendencies of all the wheels of four-wheel-drive vehicles.

In particular, there is a problem in the four-wheel-drive vehicles that since a braking pressure to a wheel is large, slips are caused in other wheels, and the braking pressure cannot be properly adjusted in such a case.

As described above, the conventional antiskid brake controllers reduce or increase a braking pressure by detecting a slip state in each of the wheels. However, since a wheel is coupled through the non-differential limit mechanism of the other wheel (or directly) in the four-wheel-drive vehicle so that power is transmitted to all the wheels, there is a problem that a locked state cannot be avoided by properly adjusting the braking pressures to all the wheels.

An object of the present invention made to solve the above problem is to provide an antiskid brake controller capable of avoiding a cascade (an unstable state) which is caused when a braking pressure is reduced in four-wheel-drive vehicles.

SUMMARY OF THE INVENTION

An antiskid brake controller according to the present invention comprises wheel speed sensing means for individually detecting the rotational speeds of a plurality of wheels as wheel speeds; braking force adjustment means for adjusting braking pressures to the respective wheels in response to the application of a brake; and an ECU for calculating control amounts to the braking force adjustment means based on the wheel speeds when the brake is applied so as to prevent the locking tendencies of the respective wheels, wherein the ECU comprises wheel deceleration calculation means for calculating wheel decelerations corresponding to the locking tendencies of the respective wheels based on the wheel speeds; basic vehicle speed calculation means for calculating a basic vehicle speed based on the wheel speeds; slip amount calculation means for calculating slip amounts based on the wheel speeds and the basic vehicle speed; cascade determination means for determining a cascade when there is exhibited an unstable state that the slip amounts of at least three of the plurality of wheels are larger than a predetermined value; and control amount correction means for changing the control amounts of the braking pressures in a pressure reduction amount increasing direction when the occurrence of the cascade is determined.

The control amount correction means of the antiskid brake controller according to the present invention comprises pressure increasing side returning means for returning the braking pressures to the plurality of wheels to a pressure increasing state, within a range in which the locking tendencies of the respective wheels are prevented; and pressure increase restriction means for restricting the return of the braking pressures to the pressure increasing state when the occurrence of the cascade is determined by the cascade determination means.

The cascade determination means of the antiskid brake controller according to the present invention determines the occurrence of cascade based on the slip amounts of three wheels of the plurality of wheels; and the control amount correction means starts increasing the amount of pressure reduction control when the wheel deceleration of any of the plurality of wheels exceeds a first threshold value, and lowers the level of the first threshold value, when the cascade is determined.

The control amount correction means of the antiskid brake controller according to the present invention sets a second threshold value, for determining a timing at which the pressure reduction amount increasing control is finished in accordance with the slip amounts, to a level lower than that of the first threshold value and makes the period of the pressure reduction amount increasing control variable in an extending direction.

The cascade determination means of the antiskid brake controller according to the present invention determines the occurrence of cascade when one of the front wheels of the plurality of wheels exhibits a slip amount larger than a first predetermined value as well as the two rear wheels of the plurality of wheels exhibits a slip amount larger than a second predetermined value.

The cascade determination means of the antiskid brake controller according to the present invention determines the occurrence of the cascade when one of the rear wheels of the plurality of wheels exhibits a slip amount larger than the first predetermined value as well as the two front wheels of the plurality of wheels exhibits a slip amount larger than the second predetermined value.

The level of the first predetermined value of the antiskid brake controller according to the present invention is set larger than that of the second predetermined value.

The antiskid brake controller according to the present invention comprises road surface friction factor presuming means for presuming a road surface friction factor and the cascade determination means determines the occurrence of the cascade when the road surface friction factor exhibits a value smaller than a predetermined value.

The cascade determination means of the antiskid brake controller according to the present invention determines the occurrence of the cascade when the rear wheel on a low speed side of the plurality of wheels exhibits that it is being decelerated.

DESCRIPTION OF THE PREFERRED EMBODIMENT

Embodiment 1

An embodiment 1 of the present invention will be described with reference to the drawings.

Figure 1:
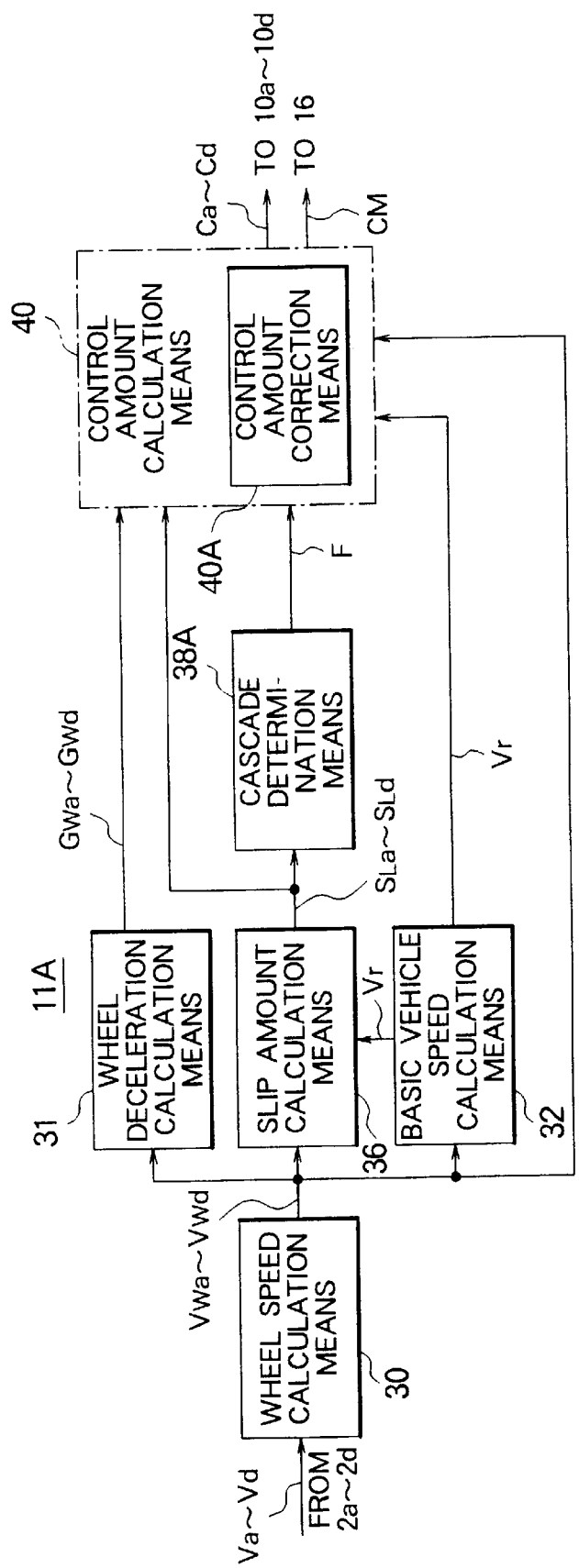
FIG. 1 is a function block diagram showing an embodiment 1 of the present invention.

FIG. 1 is a function block diagram showing the arrangement of an ECU 11A according to the embodiment 1 of the present invention, wherein wheel speed sensors 2a–2d, actuators 10a–10d and a motor relay 16 are arranged likewise those described above.

Figure 10:
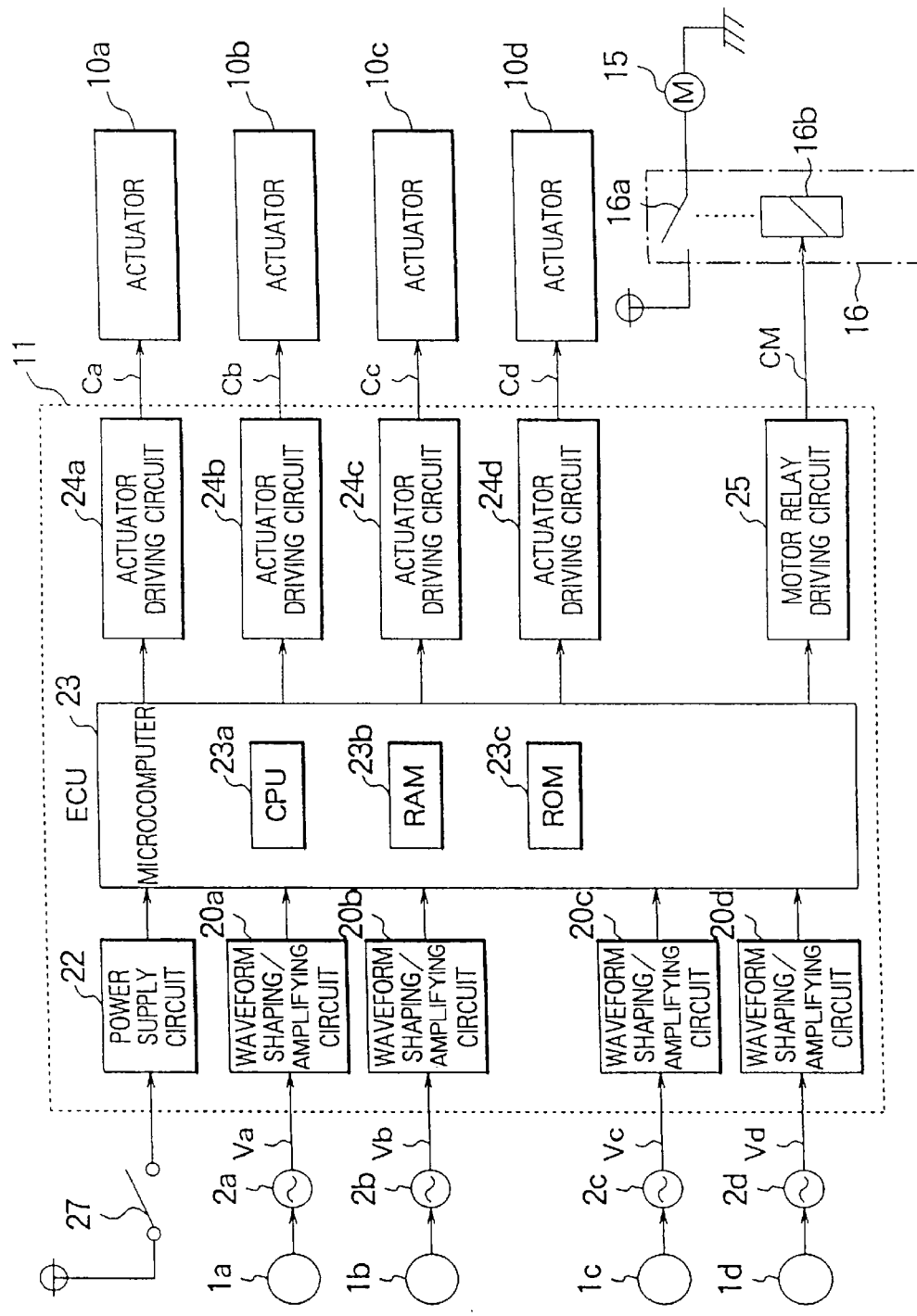
FIG. 10 is a block diagram showing the schematic arrangement of a conventional antiskid brake controller.
Figure 11:
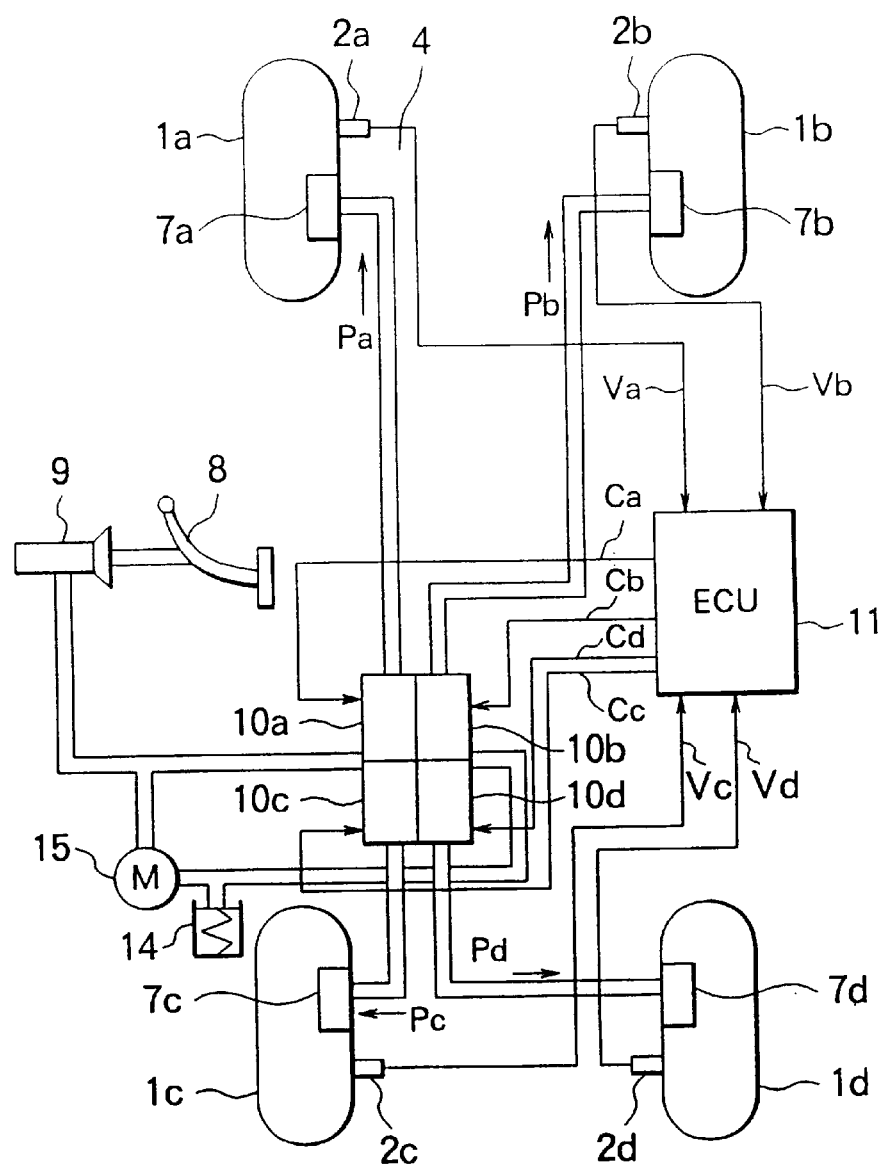
FIG. 11 is a view showing the arrangement of a hydraulic passage in the vicinity of actuators in FIG. 10.
Figure 12:
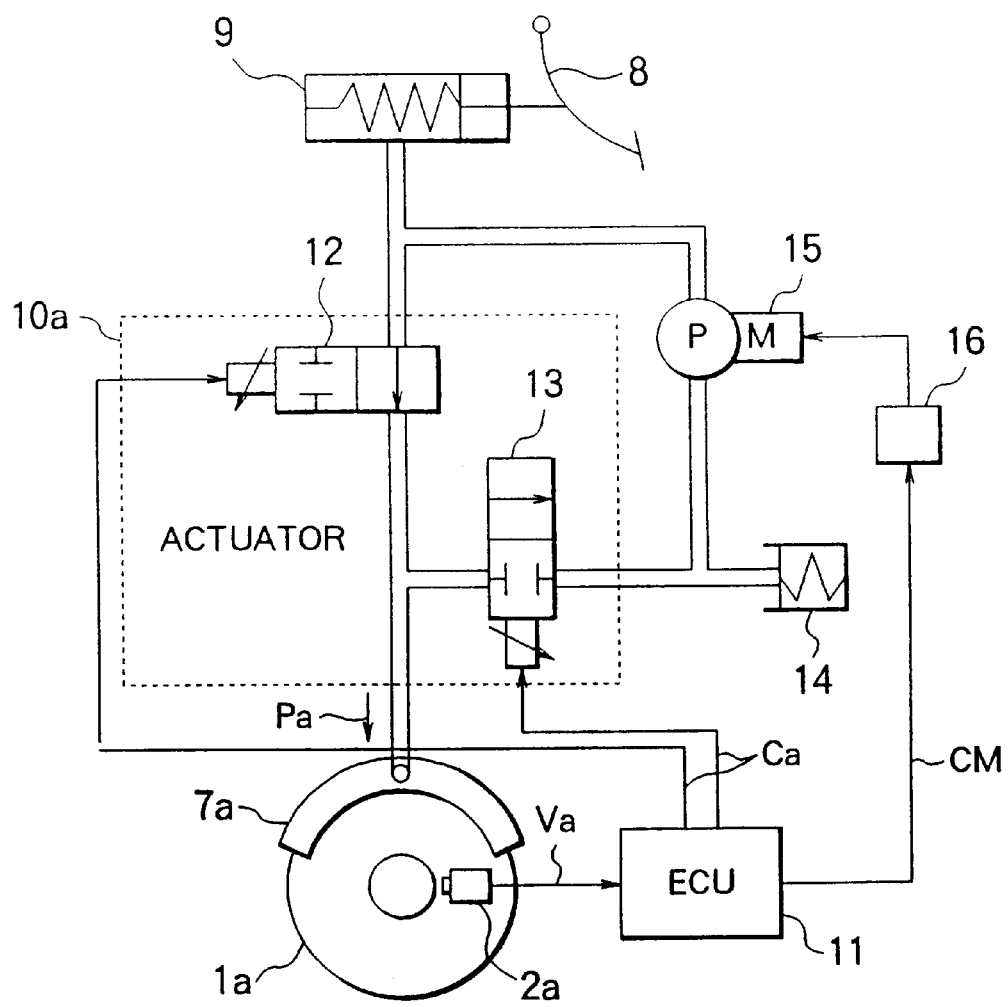
FIG. 12 is a view showing the arrangement of the hydraulic passage in detail when attention is paid to one system of the hydraulic passage.

Further, the entire arrangement of the embodiment 1 of the present invention and the arrangement in the vicinity of the actuators 10a–10d and a motor 15 are as shown in FIG. 10 to FIG. 12.

The ECU 11A for preventing the locking tendencies of the respective wheels 1a–1d includes wheel speed calculation means 30 for calculating wheel speeds Vwa–Vwd based on wheel speed signals Va–Vd from the respective wheel speed sensors 2a–2d, wheel deceleration calculation means 31 for calculating wheel decelerations Gwa–Gwd corresponding to the locking tendencies of respective wheels 1a–1d based on the wheel speeds Vwa–Vwd and basic vehicle speed calculation means 32 for calculating a basic vehicle speed Vr based on the wheel speeds Vwa–Vwd.

The ECU 11A includes slip amount calculation means 36 for calculating slip amounts SLa–SLd based on the wheel speeds Vwa–Vwd and the basic vehicle speed Vr and cascade determination means 38A for determining a cascade when there is exhibited an unstable state that the slip amounts of at least three of the wheels 1a–1d are larger than a predetermined value and outputting a cascade signal F composed of a flag signal.

Further, the ECU 11A includes control amount calculation means 40 for calculating control amounts to the respective power adjustment means 10a–10d and 16 based on the wheel speeds Vwa–Vwd and the wheel decelerations Gwa–Gwd when a brake is applied and control amount correction means 40A for changing the control amounts of the braking pressures Pa–Pd in a pressure reduction amount increasing direction in response to at least the cascade signal F.

The control amount correction means 40A belongs to the control amount calculation means 40, changes the control amounts from the control amount calculation means 40 in a pressure reducing direction and outputs control signals Ca–Cd and CM to the actuators 10a–10d and the motor relay 16 after the control amounts are changed.

Figure 2:
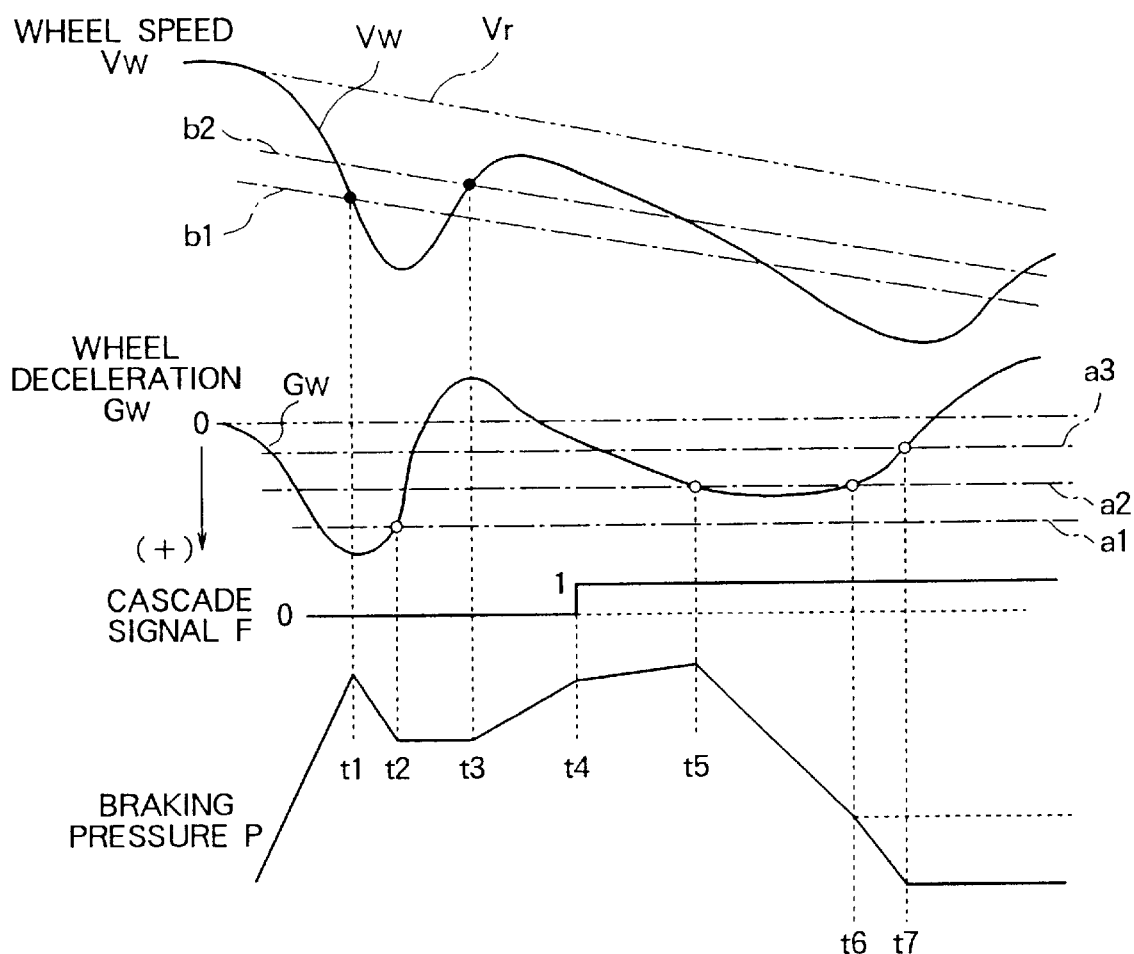
FIG. 2 is a timing chart showing pressure reduction increasingly correcting operation executed by an embodiment of the present invention.

FIG. 2 is a timing chart showing an example of ABS control (antiskid brake control) executed by the control amount calculation means 40 and the control amount correction means 40A in FIG. 1 and shows a processing for correcting the pressure reduction and pressure increase of the braking pressure P based on the waveform Vw of one of the wheel speeds Vwa–Vwd, the waveform Gw of one of the wheel decelerations Gwa–Gwd and the cascade signal F.

In FIG. 2, dot-dash-lines b1 and b2 show threshold values for the wheel speed Vw and dot-dash-lines a1 to a3 show threshold values variably set for the wheel deceleration Gw.

Note, the threshold values b1, b2 used as the pressure reducing or pressure increasing condition of the braking pressure P substantially correspond to the threshold value of the slip amount SL.

Although the braking pressure P is reduced at the time when the wheel speed Vw falls below the threshold value b1 here, the pressure reduction may alternatively be started based on the comparison of the wheel deceleration Gw, composed of the differential waveform of the wheel speed Vw (whose phase advances more than that of the wheel speed Vw), with the threshold value a1.

The control amount correction means 40A which constitute a portion of the function of the control amount calculation means 40 includes pressure increasing side returning means for returning the braking pressure P to a pressure increasing state within a range in which the locking tendencies of the respective wheels 1a–1d are prevented based on the basic vehicle speed Vr, and pressure increase restriction means for restricting the return of the braking pressure P to the pressure increasing state in response to the cascade signal F.

The control amount calculation means 40 and the control amount correction means 40A include threshold value setting means for setting the respective threshold values a1–a3, b1 and b2, the threshold value (allowable value) of the slip amount SL and the like and comparison means for comparing respective parameters such as the wheel speed Vw, the wheel deceleration Gw, the slip amount SL and the like with the respective threshold values.

The control amount correction means 40A may lower the level of the first threshold value a1 to that of the second threshold value a2 when the cascade signal F is created in accordance with the slip amounts SL of other wheels as well as start the pressure reduction amount increasing control when the wheel deceleration Gw of any of the respective wheels 1a–1d exceeds the second threshold value a2 to thereby make the period of the pressure reduction amount increasing control variable in an extending direction.

The control amount calculation means 40 starts to reduce the braking pressure P at a time t1 when the wheel speed Vw is lowered below the threshold value b1 on a low level side by the increase of the braking pressure P when the brake is applied and switches the braking pressure p to a pressure maintenance mode at a time t2 when the wheel deceleration Gw is lowered to a level smaller than that of the first threshold value a1.

Further, the control amount calculation means 40 resumes the increase of the braking pressure P at a time t3 when the wheel speed Vw increases above the threshold value b2 on a high level side to improve a braking capability.

Since no cascade signal F is created until the above timing, ordinary ABS control is executed.

Thereafter, at a time t4 when the slip amounts SL of the other three wheels of the respective wheels exceed the predetermined value and the cascade signal F is created by cascade determination means 38A, the control amount correction means 40A restricts the increase of the braking pressure P.

At the time, the control amount correction means 40A sets the second threshold value a2 whose level is smaller than that of the first threshold value a1 to the wheel deceleration Gw.

Therefore, the reduction of the braking pressure P is started at a time earlier than a usual time at a time t5 when the level of the wheel deceleration Gw exceeds the second threshold value a2, so that the pressure reduction control is corrected in a pressure increasing direction.

When the slip amounts SL of the wheels exhibit values larger than the predetermined value, the control amount calculation means 40a variably sets the second threshold value a2, which determines the timing when the pressure reduction increasing control is finished, to the third threshold value a3 having a smaller level.

Therefore, the timing at which the pressure reduction increasing control to the braking pressure P is finished is delayed from a time t6 at which the level of the wheel deceleration Gw is made below the second threshold value a2 to a time t7 when it is made below the third threshold value a3, so that the period of the pressure reduction increasing control is extended.

The braking pressure p is kept in the pressure maintenance mode after the time t7 when the pressure reduction increasing control is finished.

When the slip amounts SL of the respective wheels are reduced and the cascade signal F is made to "0" during the period from the time t5 to the time t7, if the level of the wheel deceleration Gw is smaller than that of the first threshold value a1, the braking pressure P is switched to the pressure maintenance mode at once.

When a slip amount SL larger than the predetermined value is detected while the pressure reducing period is extended due to the third threshold value a3, threshold values having smaller levels (not shown) may be sequentially set.

Although the threshold value a3 whose level is smaller than that of the second threshold value a2 is set here, since the pressure reduction increasing control period is already extended by setting the second threshold value a2, the braking pressure P may be switched to the pressure maintenance mode at the time t6 without setting the third threshold value a3.

Next, operation of the embodiment 1 of the present invention shown in FIG. 1 will be described with reference to the flowcharts of FIG. 3 to FIG. 5.

Figure 3:
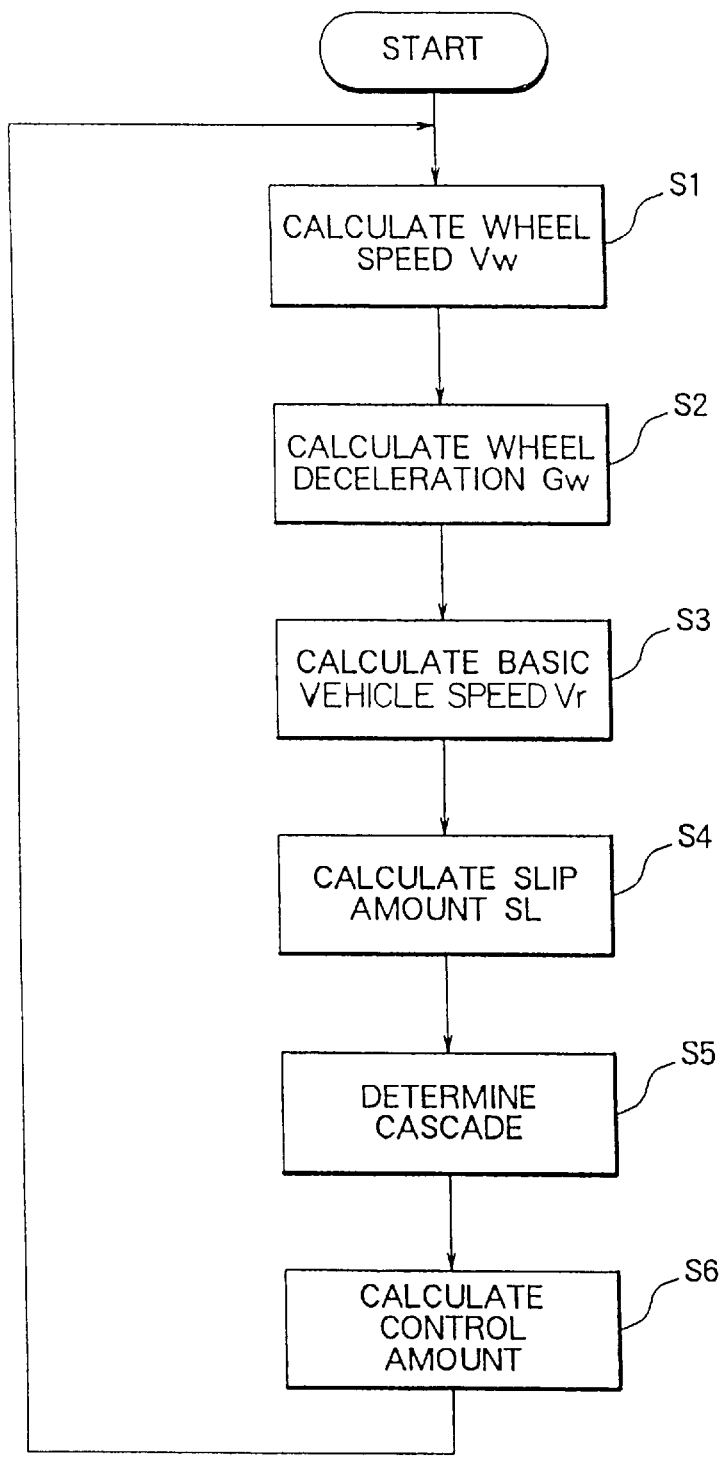
FIG. 3 is a flowchart showing the pressure reduction increasingly correcting operation executed by the embodiment 1 of the present invention.
Figure 4:
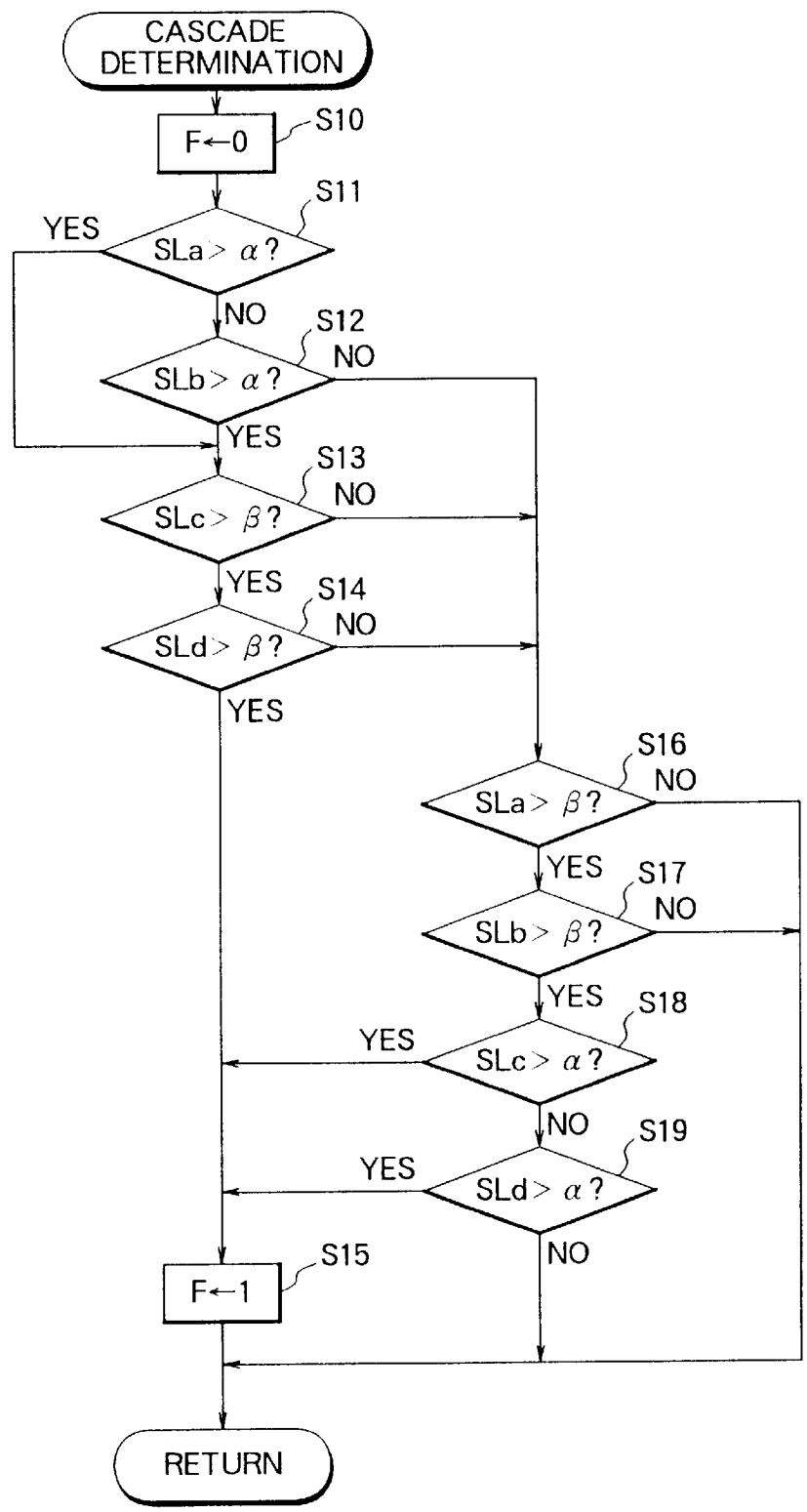
FIG. 4 is a flowchart showing cascade determining operation executed by the embodiment 1 of the present invention.
Figure 5:
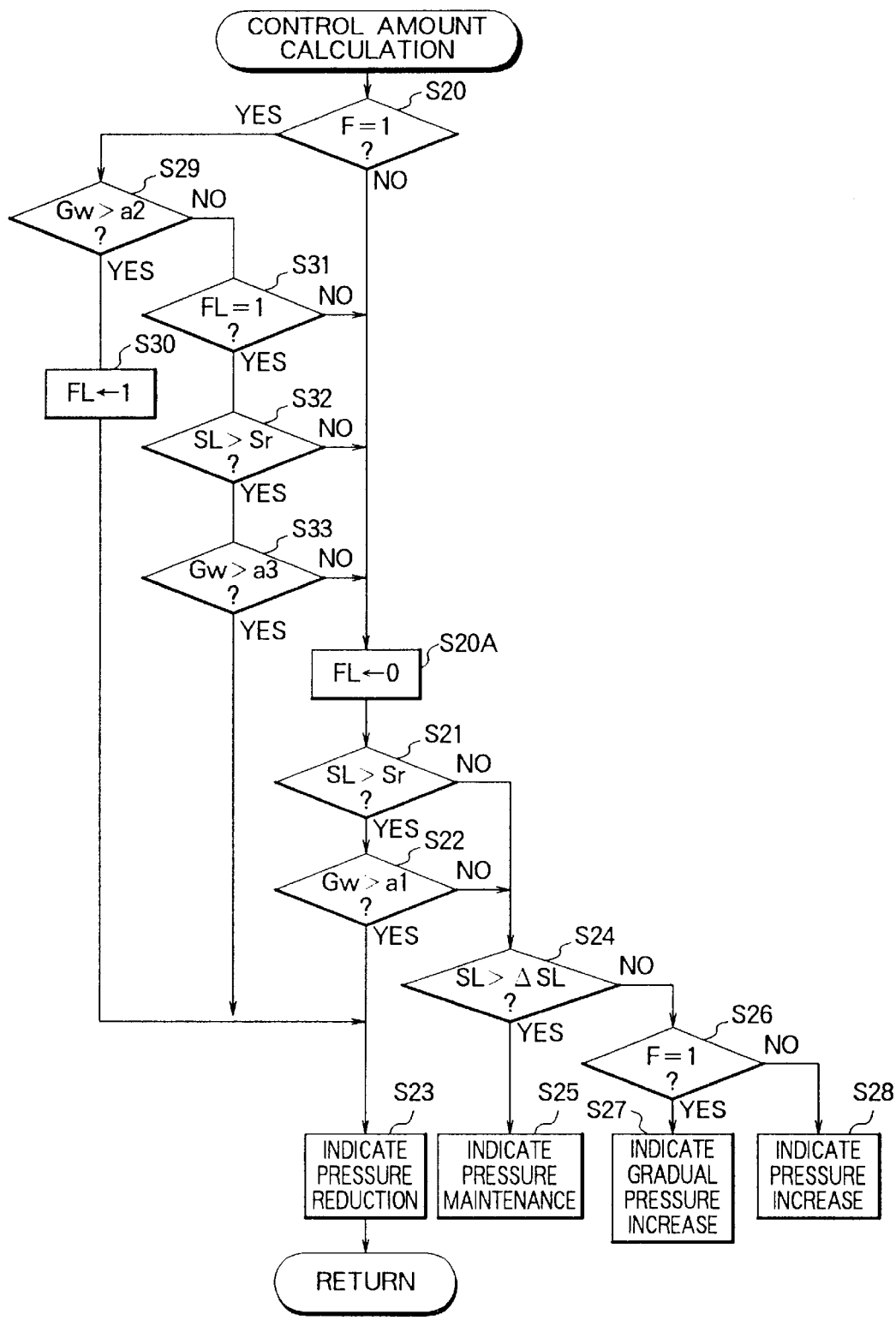
FIG. 5 is a flowchart showing control amount calculating operation executed by an embodiment 1 of the present invention.

FIG. 3 shows schematic processing operation of the controller according to the present invention as a whole, FIG. 4 shows an example of specific processing operation executed at step S5 for determining a cascade in FIG. 3 and FIG. 5 shows specific processing operation executed at step S6 for calculating control amounts in FIG. 3. Further, the wheel speeds Vwa–Vwd and the wheel decelerations Gwa–Gwd are shown as Vw and Gw as the general terms thereof.

In FIG. 3, first, after the ECU 11A initializes the RAM 23b (refer to FIG. 10) and the like in the microcomputer 23, the wheel speed calculation means 30 determines the wheel speed Vw of each of the wheels 1a–1d from the respective wheel speed signals Va–Vd (step S1).

Subsequently, the wheel deceleration calculation means 31 in the ECU 11A calculates the wheel deceleration Gw of each of the wheels 1a–1d based on the change in time of the wheel speeds Vw (step S2).

It is assumed here that the wheel deceleration Gw shows the decelerating state of the wheel by Gw>0 and the accelerating state thereof by Gw<0.

The basic vehicle speed calculation means 32 presumingly calculates the basic vehicle speeds Vr based on the wheel speed Vw (step S3) and the slip amount calculation means 36 presumingly calculates the slip amount SL of each of the wheels 1a–1d from the difference (Vr–Vw) between the wheel speed Vw and the basic vehicle speed Vr.

When there is exhibited an unstable state (corresponding to a locking tendency) that the slip amounts of at least three of the wheels 1a–1d exceed the predetermined value, the cascade determination means 38A determines the occurrence of a cascade and outputs the cascade signal F (step S5).

At the time, the cascade determination means 38A may determine the cascade when, for example, one of the front wheels of the wheels 1a–1d exhibits a slip amount larger than a first predetermined value α (for example, about 3 Km/h) and the two rear wheels exhibit a slip amount larger than a second predetermined value β (for example, about 2 Km/h).

Further, the cascade determination means 38A may determine the cascade when one of the rear wheels exhibits a slip amount larger than the first predetermined value α and the two front wheels exhibit a slip amount larger than the second predetermined value β.

Note, it is assumed that the level of the first predetermined value α is set larger than that of the second predetermined value β as described above.

Finally, the control amount calculation means 40 and the control amount correction means 40A calculate control amounts to the respective actuators 10a–10d and the motor relay 16 and output the control signals Ca–Cd and CM (step S6).

FIG. 4 specifically shows step S5 for determining the cascade in FIG. 3 in which the cascade is determined when the three of the four wheels 1a–1d exhibit a slip amount SL larger than the predetermined value.

In FIG. 4, first, the cascade determination means 38A resets the level of the cascade signal F (a flag) to "0" (step S10) and determines whether the slip amount SLa of the wheel 1a (the front left wheel) exceeds the first predetermined value α or not (step S11).

When it is determined SLa≦α (that is, NO) at step S11, the cascade determination means 38A subsequently determines whether the slip amount SLb of the wheel 1b (the front right wheel) exceeds the first predetermined value α or not (step S12).

When one of the slip amounts SLa and SLb of the front wheels exceeds the first predetermined value α and it is determined SLa>α or SLb>α (that is, YES) at step S11 or step S12, the cascade determination means 38A subsequently determines whether the slip amount SLc of the wheel 1c (the rear left wheel) exceeds the second predetermined value β (<α) or not (step S13).

When it is determined SLc>β (that is, YES) at step 13, the cascade determination means 38A subsequently determines whether the slip amount SLd of the wheel 1d (the rear right wheel) exceeds the second predetermined value β or not (step S14).

When both the slip amounts SLc and SLd of the rear wheels exceed the second predetermined value β and it is determined SLd>β (that is, YES) at step S14, the cascade determination means 38A sets the cascade signal F to "1" (step S15) and the process returns.

The state of the cascade can be set, for example, such that the slip amounts SLa and SLb of the front wheels are divided into large and small values across the first predetermined value α, and the slip amounts SLc and SLd of the rear wheels have values larger than the second predetermined value β and the values are located between the slip amounts SLa and SLb of the front wheels.

On the other hand, when it is determined SLb≦α, SLc≦β and SLd≦β (that is, NO) in any of steps S12–S14, the cascade determination means 38A subsequently determines whether the slip amount SLa of the wheel 1a (the front left wheel) exceeds the second predetermined value β or not (step S16).

When it is determined SLa>β (that is, YES) at step S16, the cascade determination means 38A subsequently determines whether the slip amount SLb of the wheel 1b (the front right wheel) exceeds the second predetermined value β or not (step S17).

When both the slip amounts SLa and SLb of the front wheels exceed the second predetermined value β and it is determined SLb>β (that is, YES) at step S17, the cascade determination means 38A subsequently determines whether the slip amount SLc of the wheel 1c (the rear left wheel) exceeds the first predetermined value α or not (step S18).

When it is determined SLc≦α (that is, NO) at step S18, the cascade determination means 38A subsequently determines whether the slip amount SLd of the wheel 1d (the rear right wheel) exceeds the first predetermined value α or not (step S19).

When one of the slip amounts SLc and SLd of the rear wheels exceeds the first predetermined value α and it is determined SLc>α or SLd>α (that is, YES) at step S18 or S19, the cascade determination means 38A sets the cascade signal F to "1" (step S15) and the process returns.

The state of the cascade can be set, for example, such that the slip amounts SLc and SLd of the rear wheels are divided into large and small amounts across the first predetermined value α, and the slip amounts SLa and SLb of the front wheels have values larger than the second predetermined value β and the values are located between the slip amount SLc and the slip amount SLd of the rear wheels.

In FIG. 5 which specifically shows step S6 for calculating the control amounts in FIG. 3, first, the control amount correction means 40A which is in cooperation with the control amount calculation means 40 determines whether the level of the cascade signal F is "1" (the flag is turned ON) or not (step S20).

When it is determined F=0 (that is, NO) at step S20, since no unstable state is caused, a flag FL for reducing the threshold value of the wheel deceleration Gw (to be derived later) is cleared to "0" (step S20A) and it is subsequently determined whether the slip amount SL is larger than the threshold value Sr or not (step S21) to execute ordinary ABS control.

At the time, the threshold value Sr of the slip amount SL corresponds to an ordinary pressure reduction start condition and is set to an allowable value of, for example, about 3 Km/h.

When it is determined SL>Sr (that is, YES) at step S21, it is subsequently determined whether the wheel deceleration Gw exceeds the threshold value a1 of a maximum level (step S22). The threshold value a1 corresponds to the ordinary pressure reduction start condition and sets the maximum level so as not to sacrifice the braking capability.

When it is determined Gw>a1 (that is, YES) at step S22, it is indicated to reduce the braking pressure P by the ordinary ABS control (step S23) and the process returns to step S1 (refer to FIG. 3).

On the other hand, when it is determined SL≦Sr or Gw≦a1 (that is, NO) at step S21 or step S22, it is subsequently determined at step S24 whether the slip amount SL is larger than a predetermined value ΔSL (a value within a minimum allowable range such as, for example, about 1 Km/h) or not (step S24) to maintain or increase the braking pressure P.

When it is determined SL>ΔSL (that is, YES) at step S24, since this is a state that a slip is caused to a degree by which a locking tendency is not arisen, it is indicated to maintain the braking pressure P without executing the ABS control until the locking tendency is determined (step S25) and the process returns to step S1.

Whereas, when it is determined SL<ΔSL (that is, NO) at step S24, since the slip amount SL is within the allowable range of a minimum level, first, it is determined again whether the level of the cascade signal F is "1" or not to increase the braking capability (to increase the braking pressure) (step S26).

When it is determined F=1 (that is, YES) at step S26, since the wheels are in the unstable state, it is indicated to gradually increase the pressure at a pressure increasing level which is lower than an ordinary level (step S27), whereas when it is determined F=0 (that is, NO), since the wheels are regarded to be in a stable state, it is indicated to increase the braking pressure P by the ordinary ABS control (step S28) and the process returns to step S1.

On the other hand, when it is determined F=1 (that is, YES) at step S20, since the wheels are in the unstable state, it is determined whether the wheel deceleration Gw exceeds the threshold value a2 whose level is lower than that the threshold value a1 to correct the braking pressure P in a pressure reducing direction (step S29).

When it is determined Gw>a2 (that is, YES) at step S29, the flag FL is set to "1" (step S30) and the process goes to step S23 for indicating the reduction of the braking pressure.

Whereas, when it is determined Gw≦a2 (that is, NO) at step S29, it is subsequently determined whether the flag FL is set to "1" or not (step S31).

When it is determined FL=1 (that is, YES) at step S31, it is subsequently determined whether the slip amount SL of the wheel as an object to be detected is larger than the threshold value Sr or not (step S32).

When it is determined SL>Sr (that is, YES) at step S32, it is subsequently determined whether the wheel deceleration Gw of the wheel as the object to be detected exceeds the third threshold value a3 of the minimum level or not (step S33).

When it is determined Gw>a3 (that is, YES) at step S33, the process goes to step S23 for indicating the reduction of the braking pressure.

On the other hand, when it is determined FL=0, SL≦Sr or Gw≦a3 (that is, NO) at steps S31–S33, the process goes to step S20A for determining the slip amount SL and for clearing the flag FL.

Since the wheel deceleration Gw is compared with the threshold value a2 of the low level at step 29 for determining Gw in the occurrence of the cascade, the process can easily advance to step S23 for indicating the reduction of the braking pressure. Thus, the locking tendency can be promptly avoided even in the state that a road surface friction factor is small and the wheel speed Vw is gradually lowered (directed to the locking tendency).

When the slip amount SL larger than the threshold value Sr is detected in the occurrence of the cascade, since the wheel deceleration Gw is compared with the threshold value a3 whose level is lower than that of the above threshold value a2 at step S33 for determining the wheel deceleration Gw, the return of the braking pressure to the pressure increasing control is restricted and the pressure increasing period is extended. Thus, the pressure reduction increasing control is substantially further executed.

At step S27 for indicating the gradual increase of the braking pressure in the occurrence of the cascade, for example, a long pressure increasing cycle is set and an increase gain is lowered to prevent the increase of the slip amount SL.

At respective steps S23, S25, S27 and S28 for making indications to the braking pressure P, the control signals Ca–Cd and CM are created in accordance with the respective indications.

As described above, in the four-wheel-drive vehicle, the pressure in or reducing direction can be properly controlled in such a manner that the unstable state, where the wheel speed Vw is gradually separated from the basic vehicle speed Vr without being abruptly reduced and the slip amount SL is increased, is detected as the cascade by detecting the slip states of the four wheels, whereby the stability of a body can be secured by making the slip amount SL small.

Further, when one of the front wheels and the two rear wheels exhibit the locking tendencies, when the slip amounts SL of the three wheels exhibit the locked state, or when the two front wheels and one of the rear wheels exhibit the locking tendencies, the state of the wheels which cannot be caused when the vehicle turns can be determined as the cascade by executing the determination of the cascade.

That is, the above state can be determined as the cascade, without being determined as a turning state, by detecting that the opposite relationship of the left and right wheel speeds is established between the wheel speeds of the front left and right wheels and those of the rear left and right wheels, whereby the braking pressure P can be corrected in the pressure reducing (gradually) direction.

When, for example, the wheel speeds Vwc and Vwd of the rear left and right wheels exist between the wheel speeds Vwa and Vwb of the front left and right wheels, or when the wheel speeds Vwa and Vwb of the front left and right wheels exist between the wheel speeds Vwc and Vwd of the rear left and right wheels, this is not regarded as in the turning state but determined as the cascade.

Embodiment 2

Although the embodiment 1 takes only the slip amount SL into consideration as the cascade determination condition, since an intrinsic baking capability is lowered due to the pressure reduction increasing control executed when the cascade is determined, a road surface friction factor $\mu$ may be added to the cascade determination condition.

Figure 6:
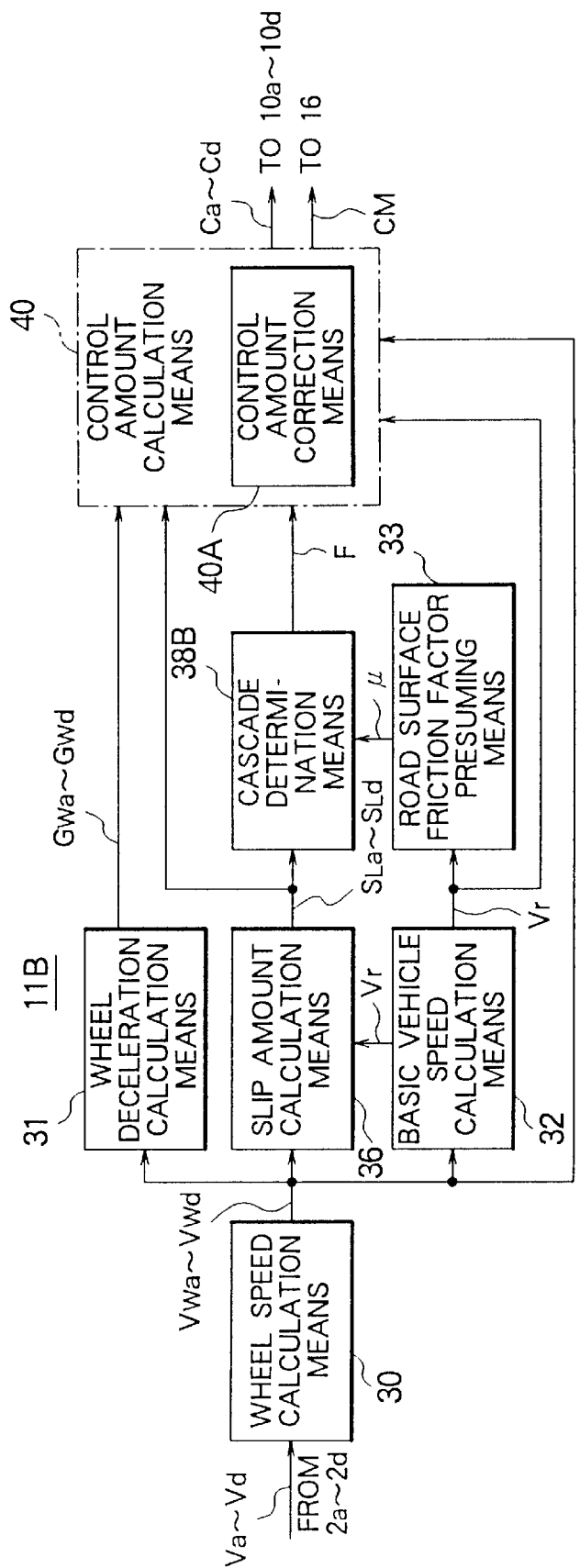
FIG. 6 is a function block diagram showing an embodiment 2 of the present invention.

FIG. 6 is a function block diagram showing an embodiment 2 of the present invention in which the road surface friction factor $\mu$ is added to the cascade determination condition. In the embodiment 2, components similar to those mentioned above are denoted by the same numerals and the detailed description thereof is omitted.

In this case, an ECU 11B includes road surface friction factor presuming means 33 for presuming the road surface friction factor $\mu$ based on the change in time of the basic vehicle speed Vr when a brake is applied, and cascade determination means 38B creates the cascade signal F in accordance with not only the slip amount SL but also the road surface friction factor $\mu$.

The road surface friction factor presuming means 33 determines the road surface friction factor $\mu$ by, for example, differentiating the basic vehicle speed Vr and subjecting it to a filter processing.

The road surface friction factor $\mu$ may be determined based on a value detected by an acceleration sensor (not shown) by using the sensor in place of the road surface friction factor presuming means 33.

Operation of the embodiment 2 of the present invention shown in FIG. 6 will be described with reference to the flowchart of FIG. 7.

Figure 7:
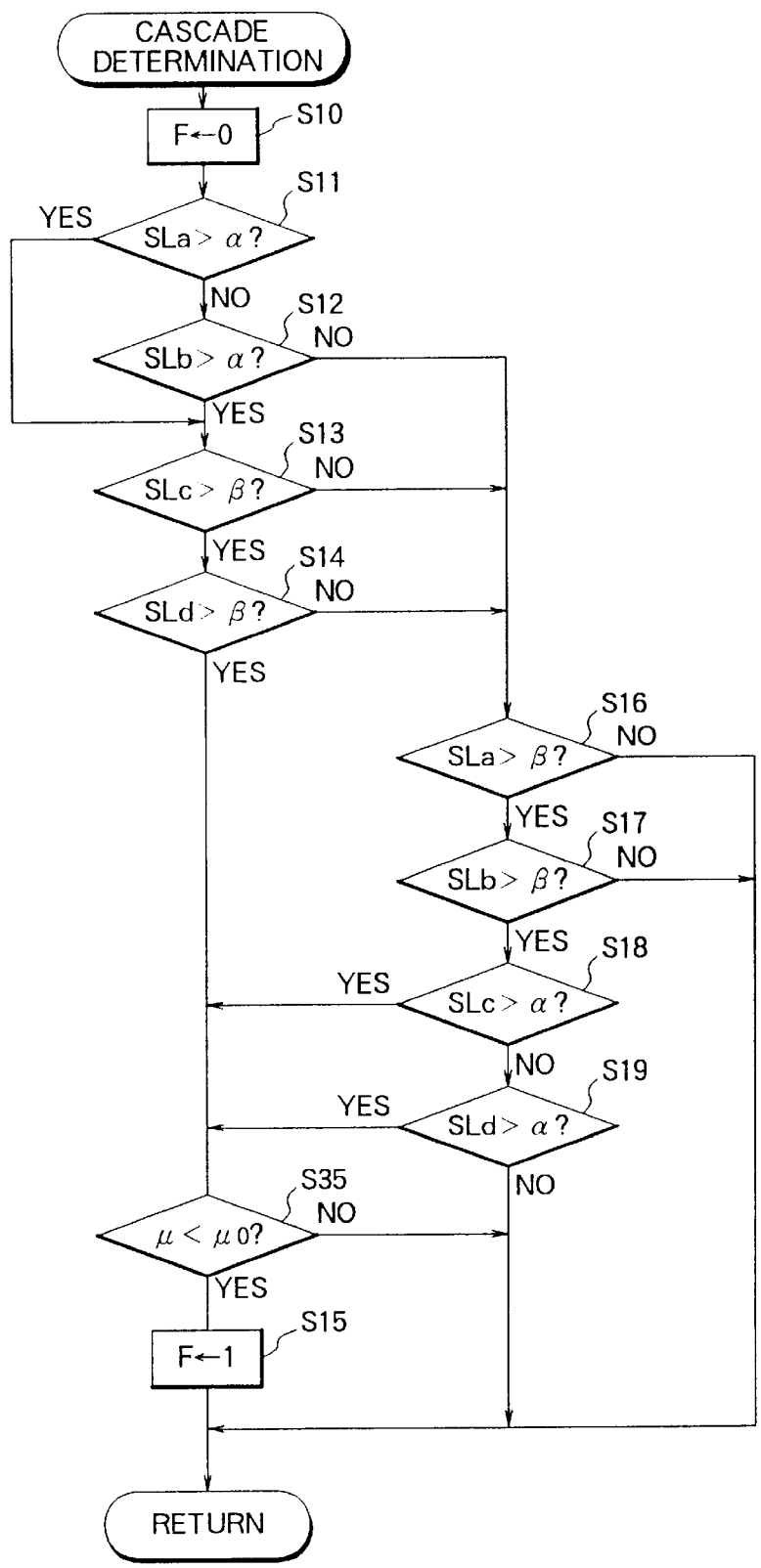
FIG. 7 is a flowchart showing cascade determining operation executed by the embodiment 2 of the present invention.

In FIG. 7, steps S10–S19 are similar to those mentioned above (refer to FIG. 4).

When it is determined SLd>β or SLd>α (that is, YES) at step S14 mentioned above or at step S19 and it is also determined that the slip amounts of three wheels exhibit the cascade, it is subsequently determined whether the road surface friction factors $\mu$ is smaller than a predetermined value $\mu_0$ (for example, about 0.5) or not (step S35).

When it is determined $\mu<\mu_0$ (that is, YES) at step S35, the process goes to step S15 where the cascade signal F is set to "1", whereas when it is determined $\mu\leq\mu_0$ (that is, NO), the process returns as it is.

With this operation, the cascade determination means 38B creates the cascade signal F when the slip amounts of the three wheels exhibit the cascade as well as the road surface friction factors $\mu$ show a value smaller than the predetermined value $\mu_0$.

As described above, the addition of the criterion that the road surface friction factor $\mu$ is small, as a condition for restricting the determination of the cascade, can restrict a state which the times when the controller is liable to get into the cascade state and can increase an accuracy with which the cascade is determined.

Further, although not shown here, the cascade determining condition may be established when both the road surface friction factor $\mu$ determined by the road surface friction factor presuming means 33 and the road surface friction factors determined by acceleration sensors, which are disposed in parallel with each other in addition to the road surface friction factor presuming means 33, exhibit values smaller than the predetermined value $\mu_0$.

In this case, since redundancy is added to the determination of the road surface friction factors $\mu$, it can be made more difficult to get into the cascade state.

Embodiment 3

Although the embodiment 2 adds the road surface friction factors $\mu$ as the cascade determination condition, the deceleration state of the rear wheels may added as the cascade determination condition.

Figure 8:
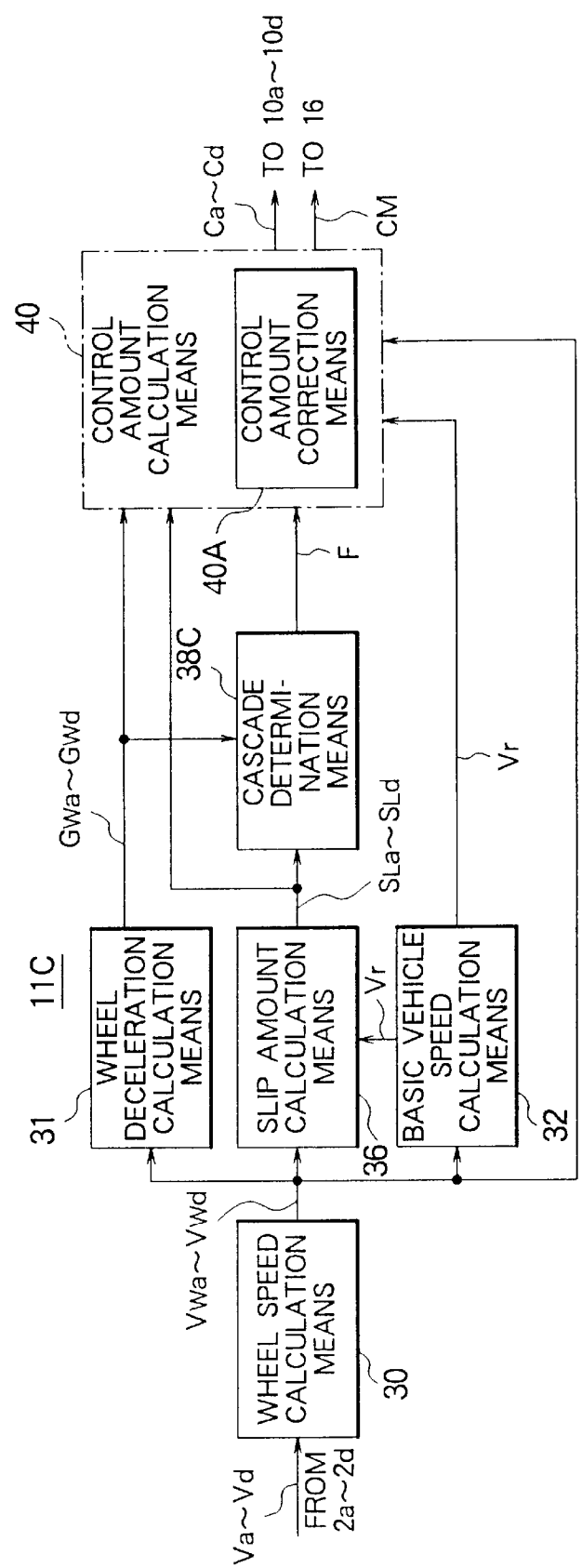
FIG. 8 is a function block diagram showing an embodiment 3 of the present invention.

FIG. 8 is a function block diagram showing an embodiment 3 of the present invention in which the rear wheel deceleration state is added as the cascade determination condition. In the embodiment 3, components similar to those mentioned above are denoted by the same numerals and the detailed description thereof is omitted.

In this case, the cascade determination means 38C of an ECU 11C employs the wheel deceleration Gw in addition to the slip amount SL in the cascade condition determination, and when it is exhibited that the wheel speed Vw of the rear wheel on a low speed side is being decelerated, the cascade determination means 38C creates the cascade signal F.

Operation of the embodiment 3 of the present invention show in FIG. 8 will be described with reference to the flowchart of FIG. 9.

Figure 9:
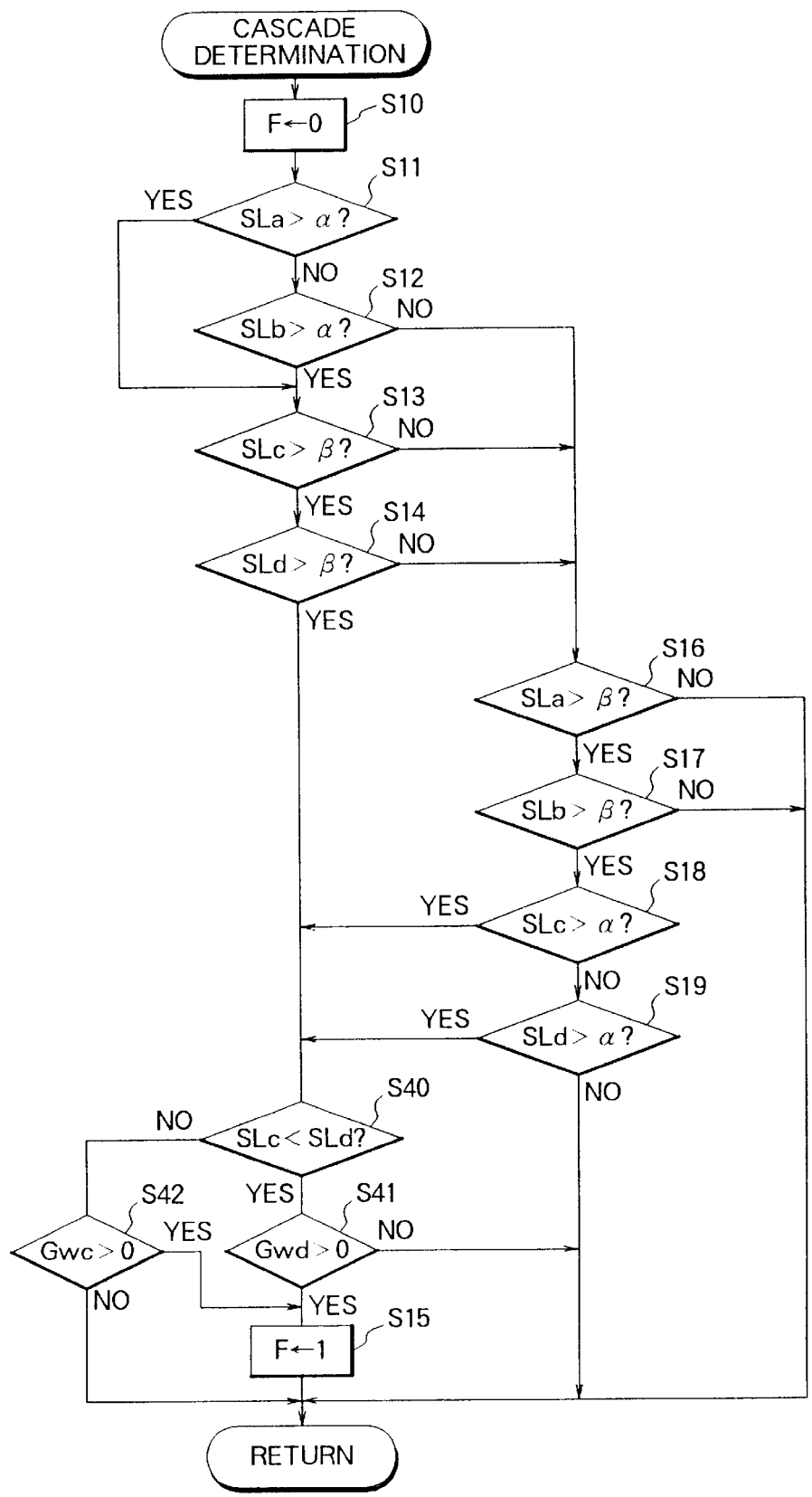
FIG. 9 is a flowchart showing cascade determining operation executed by an embodiment 3 of the present invention.

In FIG. 9, steps S10–S19 are similar to those mentioned above (refer to FIG. 4).

When it s determined SLd>$\beta$ or SLd>$\alpha$ (that is, YES) at step S14 mentioned above or at step S19 and it is also determined that the slip amounts of three wheels exhibit the cascade, the wheel on a low speed side of the rear wheels 1c and 1d is subsequently determined (step S40).

In this case, it is determined at step S40 whether the slip amount SLc of the rear left wheel is smaller than the slip amount SLd of the rear right wheel by comparing the former slip amount SLc with the latter slip amount SLd.

When it is determined SLc<SLd (that is, YES), since it is specified that the rear right wheel 1d which exhibits the larger slip amount SLd is on the low speed side, it is subsequently determined whether the wheel deceleration Gwd of the rear right wheel 1d is positive (being decelerated) or not (step S41).

Whereas, when it is determined SLc$\geq$SLd (that is, NO), since it is specified that the rear left wheel 1c which exhibits the larger slip amount SLc is on the low speed side, it is subsequently determined whether the wheel deceleration Gwc of the rear left wheel 1c is positive (being decelerated) or not (step S42).

When it is determined Gwd>0 or Gwc>0 (that is, YES) at step S41 or step 42, the process goes to step S15 for setting the cascade signal F to "1", whereas when it is determined Gwd$\leq$0 or Gwc$\leq$0 (that is, NO), the process returns as it is.

As described above, even if the cascade is exhibited by determining it only when the rear wheels are decelerated, it can be determined whether the state at the time intends to leave the state of the cascade or not by referring to the wheel decelerations of the rear wheels in order to prevent the braking pressure from being excessively reduced regardless of efforts made to leave the state of the cascade.

What is claimed is:

1. An antiskid brake controller, comprising:

wheel speed sensing means for individually detecting the rotational speeds of a plurality of wheels as wheel speeds;

braking force adjustment means for adjusting the braking pressures to each respective wheel in response to the application of a brake; and an ECU for calculating control amounts sent to said braking force adjustment means based on the wheel speeds when the brake is applied so as to prevent locking tendencies of the respective wheels;

wherein said ECU comprises:

wheel deceleration calculation means for calculating wheel decelerations, corresponding to the locking tendencies of the respective wheels, based on the wheel speeds;

basic vehicle speed calculation means for calculating a basic vehicle speed based on the wheel speeds;

slip amount calculation means for calculating slip amounts for each wheel based on the respective wheel speeds and the basic vehicle speed;

cascade determination means for determining a cascade state when the slip amounts of at least three of the plurality of wheels are larger than a predetermined value; and control amount correction means for changing the control amounts of the braking pressures in a pressure reduction direction when at least the occurrence of the cascade state is determined.

2. An antiskid brake controller according to claim 1, wherein said control amount correction means comprises:

pressure increasing side returning means for returning at least one of the braking pressures to the plurality of wheels to a pressure increasing direction, within a range in which the locking tendencies of the respective wheels are prevented; and pressure increase restriction means for restricting the return of at least one of the braking pressures to the pressure increasing direction when at least the occurrence of the cascade state is determined by said cascade determination means.

3. An antiskid brake controller according to claim 1, wherein:

when the cascade state is determined, the control amount correction means starts changing the control amounts of the braking pressures in a pressure reduction direction when the wheel deceleration of any of the plurality of wheels exceeds a first threshold value, and lowers the level of the first threshold value.

4. An antiskid brake controller according to claim 3, wherein said control amount correction means sets a second threshold value for determining a level at which the changing of the control amounts of the braking pressures in a pressure reduction direction is finished, the second threshold being set in accordance with the slip amounts to a level lower than that of the first threshold value, thereby making the period of the increase of pressure reduction amount variable in an extending direction.

5. An antiskid brake controller according to claim 1, wherein said cascade determination means determines the occurrence of the cascade state when one of the front wheels of the plurality of wheels exhibits a slip amount larger than a first predetermined slip value and the two rear wheels of the plurality of wheels exhibits a slip amount larger than a second predetermined slip value.

6. An antiskid brake controller according to claim 1, wherein said cascade determination means determines the occurrence of the cascade state when one of the rear wheels of the plurality of wheels exhibits a slip amount larger than a first predetermined slip value and the two front wheels of the plurality of wheels exhibits a slip amount larger than second predetermined slip value.

7. An antiskid brake controller according to claim 5, wherein the level of the first predetermined slip value is set larger than that of the second predetermined slip value.

8. An antiskid brake controller according to claim 6, wherein the level of the first predetermined slip value is set larger than that of the second predetermined slip value.

9. An antiskid brake controller, comprising:

wheel speed sensing means for individually detecting the rotational speeds of a plurality of wheels as wheel speeds;

braking force adjustment means for adjusting the braking pressures to each respective wheel in response to the application of a brake; and an ECU for calculating control amounts sent to said braking force adjustment means based on the wheel speeds when the brake is applied so as to prevent locking tendencies of the respective wheels;

wherein said ECU comprises:

wheel deceleration calculation means for calculating wheel decelerations corresponding to the locking tendencies of the respective wheels, based on the wheel speeds;

basic vehicle speed calculation means for calculating a basic vehicle speed based on the wheel speeds;

slip amount calculation means for calculating slip amounts for each wheel based on the respective wheel speeds and the basic vehicle speed;

cascade determination means for determining a cascade state when the slip amounts of only three of the plurality of wheels are larger than a predetermined value; and control amount correction means for changing the control amounts of the braking pressures in a pressure reduction direction when at least the occurrence of the cascade state is determined.

* * * * *